March 19, 1929. M. RITTER 1,706,323
MEMBRANE LOUD SPEAKER FOR RADIO APPARATUS, GRAMOPHONES, AND THE LIKE
Filed Oct. 4, 1926

Inventor
Max Ritter
by Langner, Parry, Card & Langner
Attys.

Patented Mar. 19, 1929.

1,706,323

UNITED STATES PATENT OFFICE.

MAX RITTER, OF BASEL, SWITZERLAND.

MEMBRANE LOUD-SPEAKER FOR RADIO APPARATUS, GRAMOPHONES, AND THE LIKE.

Application filed October 4, 1926, Serial No. 139,517, and in Switzerland October 15, 1925.

The object of this invention is a membrane loud speaker for radio apparatus, gramophone, etc., with at least one sound trumpet which has the distinctive advantage that a portion of the passage wall of the sound trumpet is formed as an oscillating continuation of the receiving membrane of the loud speaker, so that such extended part of the membrane can produce an improvement or intensification of the reproduction of sound by its harmonic simultaneous oscillation. Care must of course be taken so that the passage walls produce correct waves together with the extension part of the receiving membrane and do not give preference to disturbing harmonic oscillations. If this is so, then the sound waves, when passing through the trumpet tube, are always brought by means of the membrane extension to correct oscillation, so that great clearness in the reproduction of sound is obtained.

The accompanying drawing illustrates different examples of carrying out the invention.

Fig. 1 is a front view of one half part with the membrane removed, and

Fig. 2 a transverse section of one form of construction which comprises two sound trumpets with trumpet passages spirally wound.

Figure 1:
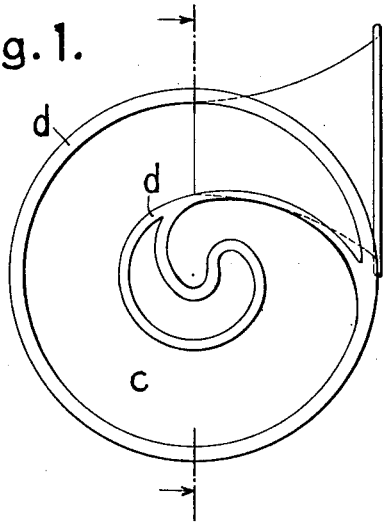
Figure 2:
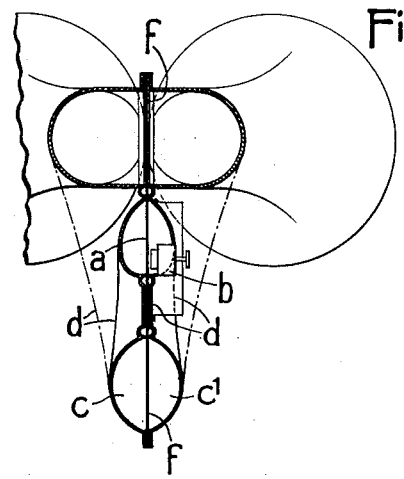
Figure 4:
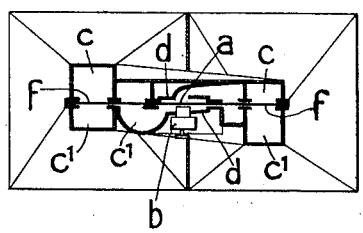
Fig. 4 is a trumpet end view of a construction similar to that of Figs. 1 and 2, showing a rectangular cross section of the trumpet.

According to Figs. 1, 2, and 4, $a$ is a membrane and $b$ the receiver influencing the latter, whilst $c$, $c^1$ represent two sound trumpet passages wound spirally round the membrane box $d$, which passages are arranged on both sides of the membrane $a$. The latter is extended outside the box room at $f$ in such manner that it forms, by its extension $f$, a portion of the passage walls of the two sound trumpets. At the clamped-in parts of the membrane $a$, care must be taken that the extension part of the same is capable of oscillating with it, so that by such harmonic simultaneous oscillation of the extension of the membrane an intensification of the reproduction of sound is obtained.

Figure 3:
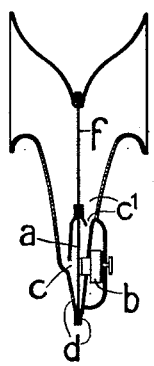
Fig. 3 is a section across a similar form in which, however, the trumpet passages are situated radially to the membrane box.

In Fig. 3 the sound trumpet passages $c$, $c^1$ are directed radially to the membrane box $d$, instead of being spirally wound. $a$ is the membrane and $b$ the receiver. $f$ is an extension or continuation of the membrane $a$; it forms here a part of the wall common to both trumpet passages $c$, $c^1$.

Fig. 4 shows an arrangement similar to that illustrated in Figs. 1 and 2, but the two spirally wound passages $c$, $c^1$ are constructed of a rectangular cross section.

Figure 5:
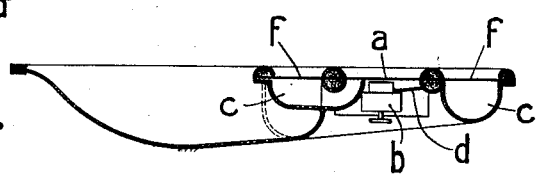
Figs. 5 and 6 show by views corresponding to Figs. 1 and 2 a constructional form with one unilateral trumpet only.
Figure 7:
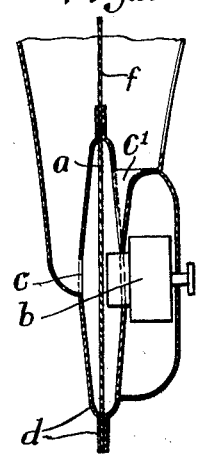
Fig. 7 is a detail view of a part of Fig. 3 on a larger scale.
Figure 6:
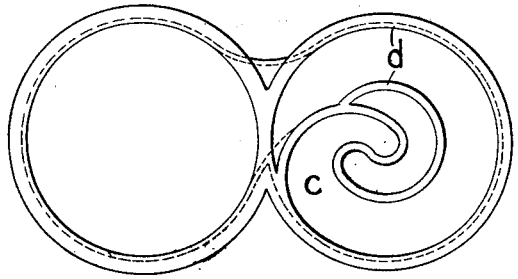

In the execution shown in Figs. 5 and 6, a trumpet passage $c$ is arranged on one side of the membrane $a$ only. The trumpet passage is wound as above described spirally round the membrane box $d$ and the membrane $a$ is also extended at $f$ in such manner that it forms a part of the wall of the trumpet passage $c$ which is capable of oscillating. $b$ is the receiver.

What I claim is:—

A membrane loud speaker for radio apparatus, gramophones and the like, comprising a receiver, a receiving box adjacent thereto, a membrane within the latter, at least one sound trumpet connected to said membrane box and an oscillating extension on said receiving membrane forming part of the wall of said sound trumpet to improve or intensify the reproduction of the sound.

In witness whereof I have hereunto signed my name this 23rd day of September, 1926.

MAX RITTER.